(12) United States Patent
Ohmura (10) Patent No.: US 10,414,394 B2
(45) Date of Patent: *Sep. 17, 2019

(54) VEHICLE CONTROL SYSTEM

(71) Applicant: MAZDA MOTOR CORPORATION, Hiroshima (JP)

(72) Inventor: Hiroshi Ohmura, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 80 days.

This patent is subject to a terminal disclaimer.

(21) Appl. No.: 15/515,089

(22) PCT Filed: Aug. 29, 2016

(86) PCT No.: PCT/JP2016/075234
§ 371 (c)(1),
(2) Date: Mar. 28, 2017

(87) PCT Pub. No.: WO2018/042499
PCT Pub. Date: Mar. 8, 2018

(65) Prior Publication Data
US 2018/0345957 A1    Dec. 6, 2018

(51) Int. Cl.
*B60W 30/09*     (2012.01)
*B60W 30/095*    (2012.01)
*B60W 30/14*     (2006.01)

(52) U.S. Cl.
CPC .......... *B60W 30/09* (2013.01); *B60W 30/095* (2013.01); *B60W 30/143* (2013.01);
(Continued)

(58) Field of Classification Search
USPC ........................................................ 701/41
See application file for complete search history.

(56) References Cited

U.S. PATENT DOCUMENTS

2003/0114973 A1*  6/2003  Takagi ................ B60R 21/0132
                                                             701/45
2003/0189871 A1* 10/2003  Brick ..................... B01F 3/0807
                                                             366/162.4
(Continued)

FOREIGN PATENT DOCUMENTS

EP     2 549 456 A1     1/2013
EP     2 648 172 A1    10/2013
(Continued)

OTHER PUBLICATIONS

International Search Report issued in PCT/JP2016/075234; dated Oct. 11, 2016.
(Continued)

*Primary Examiner* — Tyler D Paige
(74) *Attorney, Agent, or Firm* — Studebaker & Brackett PC (57) ABSTRACT

ECU 10 is configured to detect an object external to the vehicle 1, and determine a speed distribution area 40 for defining a distribution of an allowable upper limit of a relative speed of the vehicle 1 with respect to the object in a travelling direction, in a range from a lateral area to rearward and forward areas of the object in the travelling direction. The speed distribution area is determined such that the allowable upper limit is made lower as a lateral distance and a longitudinal distance from the object become smaller. When objects (8A, 8B) are detected, respective ones of the speed distribution areas (40A, 40B) for respective ones of the objects are set, the relative speed for each of objects is calculated, and an avoidance control is executed for restricting the relative speed from exceeding the allowable upper limits.

6 Claims, 10 Drawing Sheets

(52) U.S. Cl.
CPC ..... *B60W 2520/10* (2013.01); *B60W 2550/10* (2013.01); *B60W 2550/302* (2013.01); *B60W 2550/308* (2013.01)

(56) References Cited

U.S. PATENT DOCUMENTS

| | | | |
|---|---|---|---|
| 2004/0061465 A1* | 4/2004 | Matsuoka | B62D 5/0466 318/432 |
| 2004/0199327 A1* | 10/2004 | Isogai | B60K 31/0008 701/301 |
| 2005/0098986 A1* | 5/2005 | Kitagawa | B60R 21/206 280/730.1 |
| 2007/0079780 A1* | 4/2007 | Ling | F01L 9/02 123/90.12 |
| 2013/0249197 A1* | 9/2013 | Fukawatase | B60N 2/4235 280/730.2 |
| 2015/0210279 A1 | 7/2015 | Agnew et al. | |

FOREIGN PATENT DOCUMENTS

| | | |
|---|---|---|
| EP | 2 902 290 A1 | 8/2015 |
| JP | 2007-099237 A | 4/2007 |
| JP | 2011-051547 A | 3/2011 |
| JP | 2015-155295 A | 8/2015 |
| WO | 2016/024318 A1 | 2/2016 |

OTHER PUBLICATIONS

Written Opinion issued in PCT/JP2016/075234; dated Oct. 11, 2016.

The extended European search report issued by the European Patent Office dated Apr. 12, 2019, which corresponds to European Patent Application No. 16915060.4-1012 and is related to U.S. Appl. No. 15/515,089.

An Office Action mailed by the Japanese Patent Office dated Jul. 22, 2019, which corresponds to Japanese Patent Application No. 2018-536540 and is related to U.S. Appl. No. 15/515,089; with English language translation.

* cited by examiner

VEHICLE CONTROL SYSTEM

TECHNICAL FIELD

The present invention relates to a vehicle control system, and more particularly to a vehicle control system for assisting a safe travelling of a vehicle.

BACKGROUND ART

Conventionally, a motor vehicle has a plurality of safe driving assist systems which are mounted thereon and include a lane keeping assist system and/or an automated cruise system. In such systems, an automatic brake control and/or a steering assist control or the like are used respectively. Therefore, respective ones of a brake request signal for performing the automatic brake control, and a steering request signal for performing the steering assist control may be issued from respective ones of the systems. For example, the brake request signal may be issued from different systems at different timings. In such case, one of the request signals in the plurality of request signals may be prioritized over the others in the plurality of request signals (for example, refer to Patent Document 1).

CITATION LIST

Patent Document

Patent Document 1: Japanese Laid-Open Patent Publication: JP2011-051547A

SUMMARY OF INVENTION

Technical Problem

However, since there is a high possibility that the safe driving assist system may become more complicated in the future, there may be a risk in such a complicated system that the safe driving assist system may not function efficiently as a whole only by giving priority to one of such request signals.

The present invention has been made to solve the above problem, and an object thereof is to provide a vehicle control system which may efficiently perform a vehicle control for safe driving assistance.

Solution to the Technical Problem

In order to achieve the above object, the present invention provides a vehicle control system mounted on a vehicle, the system being configured for conducting control for detecting an object external to the vehicle, determining a speed distribution area which defines a distribution of an allowable upper limit of a relative speed of the vehicle with respect to the object in a travelling direction of the vehicle, in a range from a lateral area to a rearward area and from the lateral area to a forward area of the object in the travelling direction of the vehicle, the speed distribution area being determined such that the allowable upper limit is made lower as a lateral distance and a longitudinal distance from the object to the vehicle become smaller, determining respective ones of the speed distribution areas for respective ones of the objects when a plurality of objects are detected, calculating the relative speed of the vehicle for the plurality of objects in the travelling direction of the vehicle, and executing an avoidance control for restricting the relative speed of the vehicle from exceeding the allowable upper limits defined by the plurality of speed distribution areas for the plurality of objects.

In the vehicle control system in accordance with the present invention having the above features, the speed distribution area is determined over a range from the lateral area to the rearward and from the lateral area to the forward areas of the detected objects. In this speed distribution area, the allowable upper limit of the relative speed of the vehicle with respect to the object is determined. In addition, in the present invention, when a plurality of objects are detected, respective ones of the speed distribution areas are determined for respective ones of the objects, and the relative speed of the vehicle is controlled to restrict it from exceeding the allowable upper limit which is set for the plurality of speed distribution areas. Therefore, when the vehicle travels near the plurality of objects, the relative speed is limited for all of the detected objects existing around the vehicle. As such, the present invention is configured to limit the allowable upper limit for the relative speed between the object and the vehicle, and allows for integrally controlling the safe driving assist system such as the automatic brake control and the steering assist control, so that it is possible to provide the safe driving assistance through a simple and efficient speed control.

In the vehicle control system of the present invention, preferably, the speed distribution area is set such that the allowable upper limit is made lower as a lateral distance and a longitudinal distance from the object become smaller.

In the vehicle control system in accordance with the present invention having the above features, the allowable upper limit for the relative speed of the vehicle is limited according to the distance from the object, and when the vehicle is far from the object, a large relative speed is allowed, but when the vehicle approaches close to the object, the vehicle speed is limited to make the relative speed lower.

In the vehicle control system of the present invention, preferably, in the avoidance control, a speed and/or a steering direction of the vehicle is changed to restrict the relative speed of the vehicle in the plurality of speed distribution areas from exceeding the allowable upper limits.

In the vehicle control system in accordance with the present invention having the above features, in order to restrict the relative speed of the vehicle from exceeding the allowable upper limits which are set in the plurality of speed distribution areas, the system may be configured to change (decelerate) the speed itself of the vehicle, or may alternatively be configured to change the travelling path of the vehicle by changing the steering direction so that the vehicle is passed an area with a larger allowable upper limit, or may be configured to change both of the speed and the steering direction.

In the vehicle control system of the present invention, preferably, in the avoidance control, a route of the vehicle is calculated based on the plurality of speed distribution areas.

In the vehicle control system in accordance with the present invention having the above features, it is possible for the vehicle to travel on a safe route with respect to the object.

In the vehicle control system of the present invention, under a situation where a plurality of objects exist around the vehicle and the vehicle is to be passed between the two objects among the plurality of objects, it is preferable that the route is determined to extend in a travelling direction of the vehicle by connecting points where two allowable upper limits defined for the two objects are equal.

In the vehicle control system in accordance with the present invention having the above features, when the vehicle passes between the two objects, it may travel along the route where the allowable upper limit of the relative speed is largest.

In the vehicle control system of the present invention, preferably, in the avoidance control, at least one recommended travelling route is calculated to provide the vehicle with the route which makes the vehicle possible to travel at a current relative speed.

In the vehicle control system in accordance with the present invention having the above features, even if a plurality of objects are detected, the recommended travelling route is calculated to allow for the vehicle to travel without reducing the relative speed due to the existence of such objects. Thus, in the present invention, it is possible for the vehicle to travel without changing speed by travelling on the recommended travelling route.

Meritorious Effect of Invention

According to the present invention it is possible to provide the vehicle control system which may efficiently perform the vehicle control for the safe driving assistance.

DESCRIPTION OF EMBODIMENTS

Figure 1:
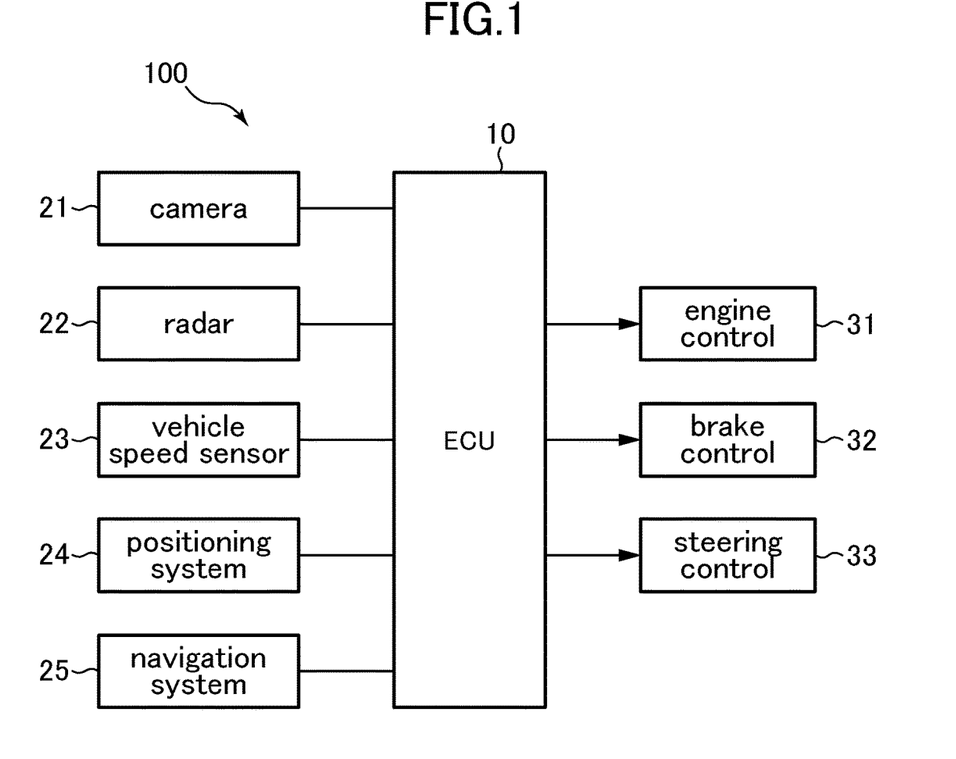
FIG. 1 is a block diagram of a vehicle control system according to one embodiment of the present invention.

With reference to the accompanying drawings, a vehicle control system according to one embodiment of the present invention will now be described. First, with reference to FIG. 1, a configuration of the vehicle control system will be described. FIG. 1 is a block diagram of the vehicle control system.

As depicted in FIG. 1, an engine control system 100 is mounted on a vehicle 1 (refer to FIG. 2), and comprises a vehicle control system (ECU) 10, a plurality of sensors, and a plurality of control systems. The plurality of sensors includes a car-mounted camera 21, a millimeter-wave radar 22, a vehicle speed sensor 23, a positioning system 24 and a navigation system 25. In addition, the plurality of control systems includes an engine control system, a brake control system 32 and a steering control system 33.

The ECU 10 is configured by a computer comprising a CPU, a memory for storing various kinds of programs, and an input/output device or the like. The ECU 10 is configured to allow for, based on the signals received from the plurality of sensors, outputting respective ones of request signals to the engine control system 31, the brake control system 32 and the steering control system 33 for appropriately activating respective ones of engine system, a brake system and a steering system. Thus, the ECU 10 can be described as functionally comprising a data acquisition part, an object detection part, a position and relative speed calculation part, a speed distribution area determining part, a route calculation part and an avoidance control executing part.

The car-mounted camera 21 takes images around the vehicle 1 and outputs the taken image data. The ECU 10 specifies an object (for example, a preceding vehicle) based on the image data. Further, the ECU 10 can specify a travelling direction or a front-back direction of the object from the image data.

The millimeter-wave radar 22 is a measurement device for measuring the position and speed of the object, which transmits an electric wave (transmission wave) toward a forward area of the vehicle 1 and receives a reflection wave which is produced as a result of the transmission wave being reflected at the object. Then, the millimeter-wave radar 22 measures the distance between the vehicle 1 and the object (for example, the inter-vehicle distance) and/or a relative speed of the object with respect to the vehicle 1 based on the transmission wave and a reception wave. Further, according to the present embodiment, it is possible to substitute the millimeter-wave radar 22 by a laser radar, an ultrasonic sensor or the like for measuring the distance and/or the relative speed with respect to the object. In addition, it is possible to configure a position and speed measurement device using the plurality of sensors.

The vehicle speed sensor 23 functions to calculate an absolute speed of the vehicle 1.

The positioning system 24 comprises a GPS system and/or a gyro system, which functions to calculate the position of the vehicle 1 (current vehicle position information).

The navigation system 25 has map information stored therein, and can provide the map information to the ECU 10. The ECU 10 specifies roads, traffic signals, structural objects or the like existing around the vehicle 1 (particularly, a forward area as seen in the travelling direction) based on the map information and the current vehicle position information. In addition, the ECU 10 may specify a scarp, a trench, a hole or the like based on the map information, which are difficult to be specified from the image data by the car-mounted camera 21. The map information may be stored in the ECU 10.

The engine control system 31 constitutes a controller for controlling an engine of the vehicle 1. The ECU 10 outputs an engine output change request signal to the engine control system 31 for requesting a change in the engine output when the vehicle 1 needs to be accelerated or decelerated.

The brake control system 32 constitutes a controller for controlling a braking device of the vehicle 1. The ECU 10 outputs a brake request signal to the brake control system 32 for requesting a braking force to be applied to the vehicle 1 when the vehicle 1 needs to be decelerated.

The steering control system 33 constitutes a controller for controlling a steering device of the vehicle 1. The ECU 10 outputs a steering direction change request signal to the steering control system 33 for requesting a change in the steering direction when the travelling direction of the vehicle 1 needs to be changed.

Figure 2:
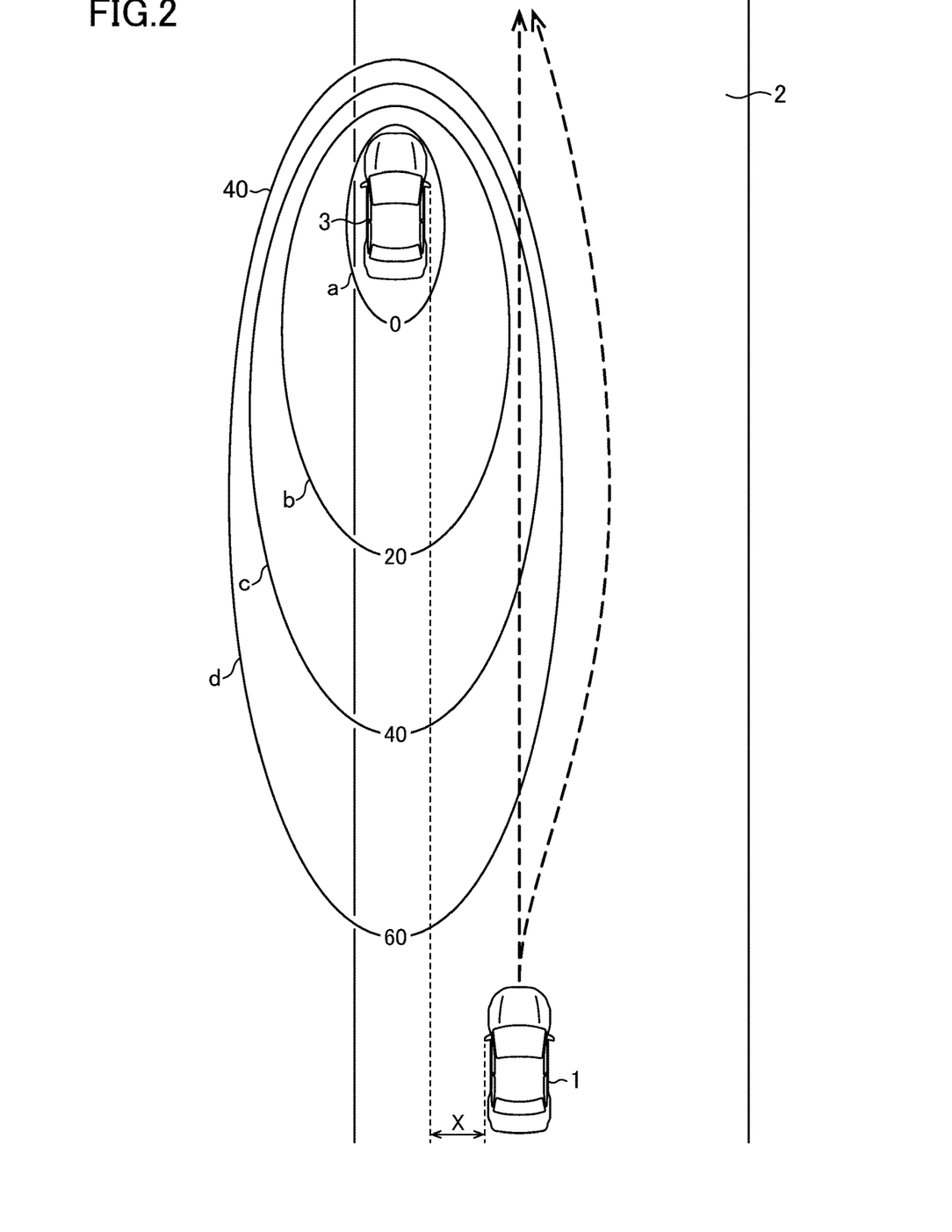
FIG. 2 is an explanatory diagram describing a passing speed control according to one embodiment of the present invention.
Figure 3:
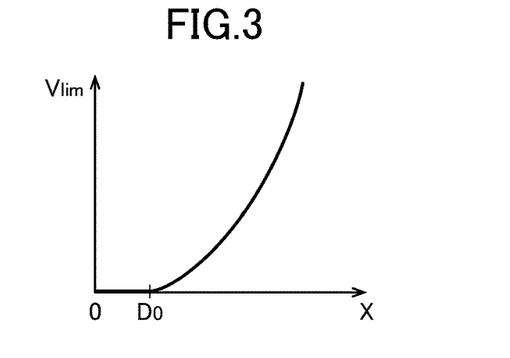
FIG. 3 is an explanatory diagram depicting a relationship between an allowable upper limit of passing speed and a clearance in a lateral direction position of an object according to one embodiment of the present invention.

Subsequently, based on FIGS. 2 and 3, description will be made on a passing speed control function according to the present embodiment. FIG. 2 is an explanatory diagram describing the passing speed control, and FIG. 3 is an explanatory diagram depicting a relationship between an allowable upper limit of passing speed and a clearance in a lateral position of an object.

In FIG. 2, there is shown a situation, wherein the vehicle 1 is travelling on a travelling lane 2, and is travelling a side of another vehicle 3 which is being parked at a side of the travelling lane 2 so that the vehicle 1 passes the vehicle 3.

Generally, when passing (or overtaking) an object (for example, a preceding vehicle, a parked vehicle, a guardrail) on or near a road, a driver of the travelling vehicle keeps a predetermined clearance or space (a lateral distance) between the travelling vehicle and the object in a lateral direction perpendicular to the travelling direction, and decelerates to a speed where the driver of the travelling vehicle feels safe. Specifically, in order to avoid dangers such as a case where the preceding vehicle suddenly changes a path, where a pedestrian comes out from a blind spot of the object, and/or where a door of the parked vehicle opens, the relative speed with respect to the object is made lower as the clearance becomes smaller.

In addition, generally, when the travelling vehicle 1 is approaching the preceding vehicle from behind, the driver of the travelling vehicle adjusts the speed (relative speed) depending on the distance between the two vehicles (longitudinal distance) along the travelling direction. Specifically, as long as the distance between the two vehicles is large, an approaching speed (relative speed) is maintained high, but when the distance between the two vehicles becomes small, the approaching speed is made low. In addition, the relative speed between both vehicles becomes zero at a predetermined inter-vehicle distance between the vehicles. This is similarly applied to a case where the preceding vehicle is the parked vehicle.

As described above, the driver drives the vehicle considering the relationship of the distance between the object and the vehicle (including the lateral distance and longitudinal distance), and the relative speed so as to avoid dangers.

Thus, in accordance with the present embodiment, as depicted in FIG. 2, the vehicle 1 is provided with a system which is configured such that a two-dimensional distribution area (speed distribution area 40) is set around the object (over a lateral area, a rearward area, and a forward area) for defining allowable upper limits for the relative speeds in the travelling direction of the vehicle 1 with respect to the object (for example, the parked vehicle 3) detected from the vehicle 1. In the speed distribution area 40, at each of points around the object, an allowable upper limit $V_{lim}$ of the relative speed is set respectively. The vehicle 1 is restricted in the relative speed with respect to the object within the allowable upper limit $V_{lim}$ in the speed distribution area 40 when the driving assistance system is activated.

As can be seen from FIG. 2, the speed distribution area 40 is set such that the allowable upper limit of the relative speed is made lower as the lateral distance and the longitudinal distance from the object become smaller (as the object is approached). In addition, in FIG. 2, for ease of comprehension, there are shown iso-relative speed lines which are drawn by connecting points with the same allowable upper limit. Respective ones of the iso-relative speed lines a, b, c and d corresponds to respective ones of the allowable upper limits $V_{lim}$ of 0 km/h, 20 km/h, 40 km/h and 60 km/h.

Further, the speed distribution area 40 may not necessarily be set all over around the object, and may be set on at least one side of the object in the lateral direction where the vehicle 1 exists (the right side area of the vehicle 3 in FIG. 2). In addition, in FIG. 2, the speed distribution area 40 is depicted also in the area where the vehicle 1 does not travel (outside of the travelling lane 2), but the speed distribution area 40 may be set only on the travelling lane 2. Further, in FIG. 2, the speed distribution area 40 of the allowable upper limit up to 60 km/h is depicted, but the speed distribution area 40 may be set up to a larger relative speed considering a case where the vehicle 1 passes an oncoming vehicle travelling in the opposite direction on the oncoming lane.

As depicted in FIG. 3, when the vehicle 1 travels at a certain absolute speed, the allowable upper limit $V_{lim}$ set in the lateral direction of the object is 0 (zero) km/h under a clearance X below $D_0$ (a safe distance), and increases as the clearance X is increased beyond a value $D_0$ along a quadratic function curve ($V_{lim}=k(X-D_0)^2$ Provided $X \geq D_0$). Specifically, for ensuring safety, the relative speed is set to zero when the clearance X is of a value at or less than $D_0$. By contrast, when the clearance is of a value at or larger than $D_0$, the vehicle 1 may be allowed to pass the object with a larger relative speed as the clearance becomes larger.

In the example of FIG. 3, the allowable upper limit in the lateral direction of the object is defined by $V_{lim}=f(X)=k(X-D_0)^2$, Here, the character k represents a gain factor related to a rate of change in $V_{lim}$ with respect to X, which is set depending on types or the like of the object. Also, $D_0$ is determined depending on types or the like of the object.

Further, in the present embodiment, $V_{lim}$ is defined as including the safe distance and to be a quadratic function of X, but the present invention is not limited thereto, and $V_{lim}$ may not include the safe distance and may be defined by another function (for example, a linear function or the like). In addition, with reference to FIG. 3, the allowable upper limit $V_{lim}$ in the lateral direction of the object has been described, but it is possible to determine the allowable upper limit $V_{lim}$ for all of radial directions including the longitudinal direction of the object. In such case, the factor k and the safe distance $D_0$ may be determined according to the directions from the vehicle to the object.

Figure 5:
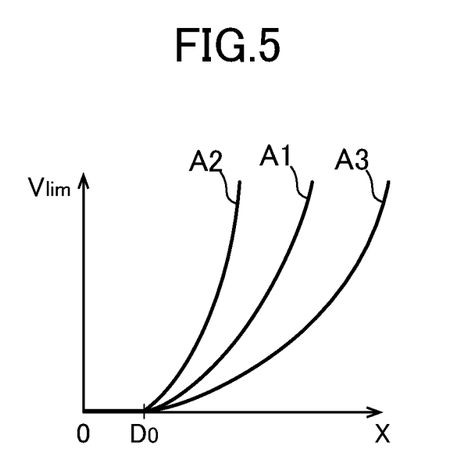
FIG. 5 is an explanatory diagram depicting a relationship between an allowable upper limit of passing speed and a clearance, the relationship being shown for several different types of objects according to one embodiment of the present invention.
Figure 6:
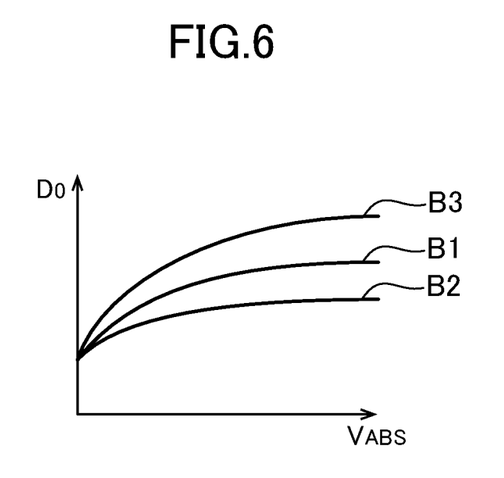
FIG. 6 is an explanatory diagram of a safe distance according to different types of objects and vehicle absolute speed according to one embodiment of the present invention.

Subsequently, with reference to FIGS. 4A, 4B, 4C, 5 and 6, other examples of the speed distribution areas will be described. Respective ones of FIGS. 4A, 4B and 4C show explanatory diagrams of the speed distribution areas in cases where the object is a guardrail or the like, a pedestrian and a traffic signal, FIG. 5 shows an explanatory diagram depicting a relationship between the allowable upper limit of passing speed and the clearance, the relationship being shown for several different types of objects, and FIG. 6 shows an explanatory diagram of the safe distance according to different types of objects and the vehicle absolute speed.

Figure 4A:
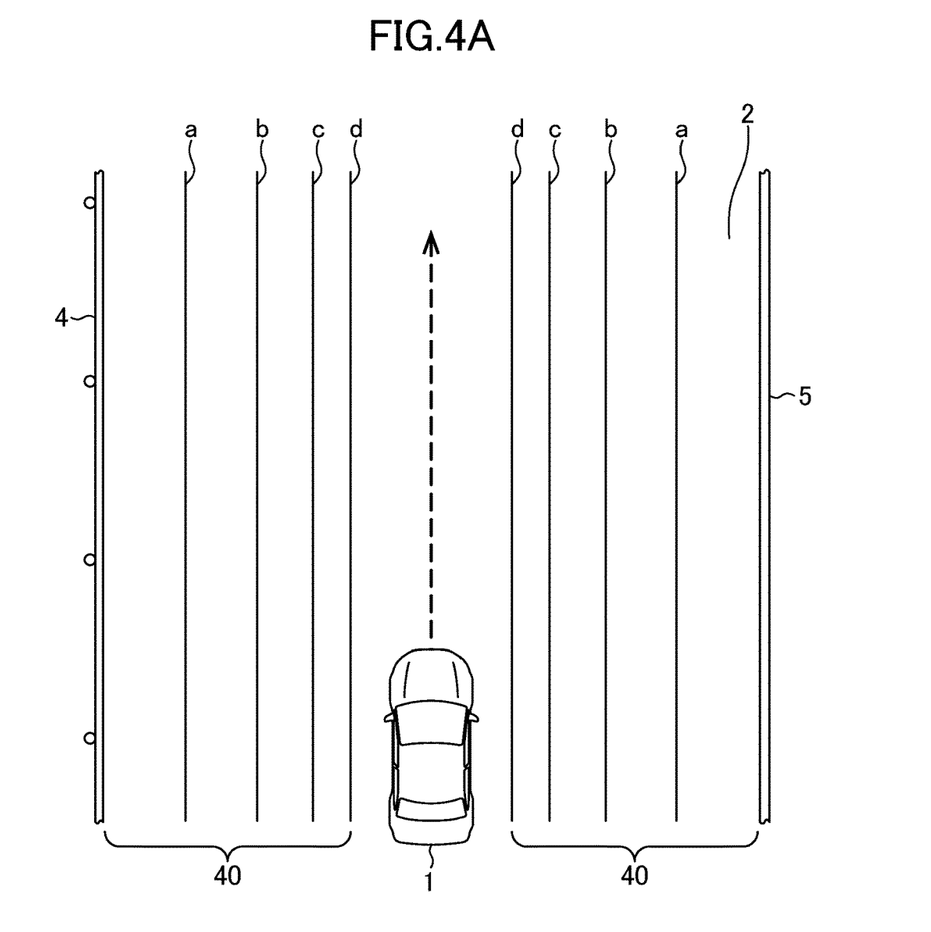
FIG. 4A is an explanatory diagram of a speed distribution area determined with respect to a guardrail or the like according to one embodiment of the present invention.

FIG. 4A depicts a case where a guardrail 4 and a lane border line 5 are provided along the travelling lane 2. It may be considered that these objects extend in a longitudinal direction along the travelling lane 2, and are comprised only of a side surface (lateral surface), or of small objects being sequentially positioned in the longitudinal direction. Thus, in the speed distribution area 40 determined with respect to such objects, iso-relative speed lines a to d are determined also to extend along the travelling lane 2. Therefore, the vehicle 1 is allowed to travel at a high speed in a center of the travelling lane 2, but its speed is limited to a lower speed as an end of the travelling lane 2 is approached.

Figure 4B:
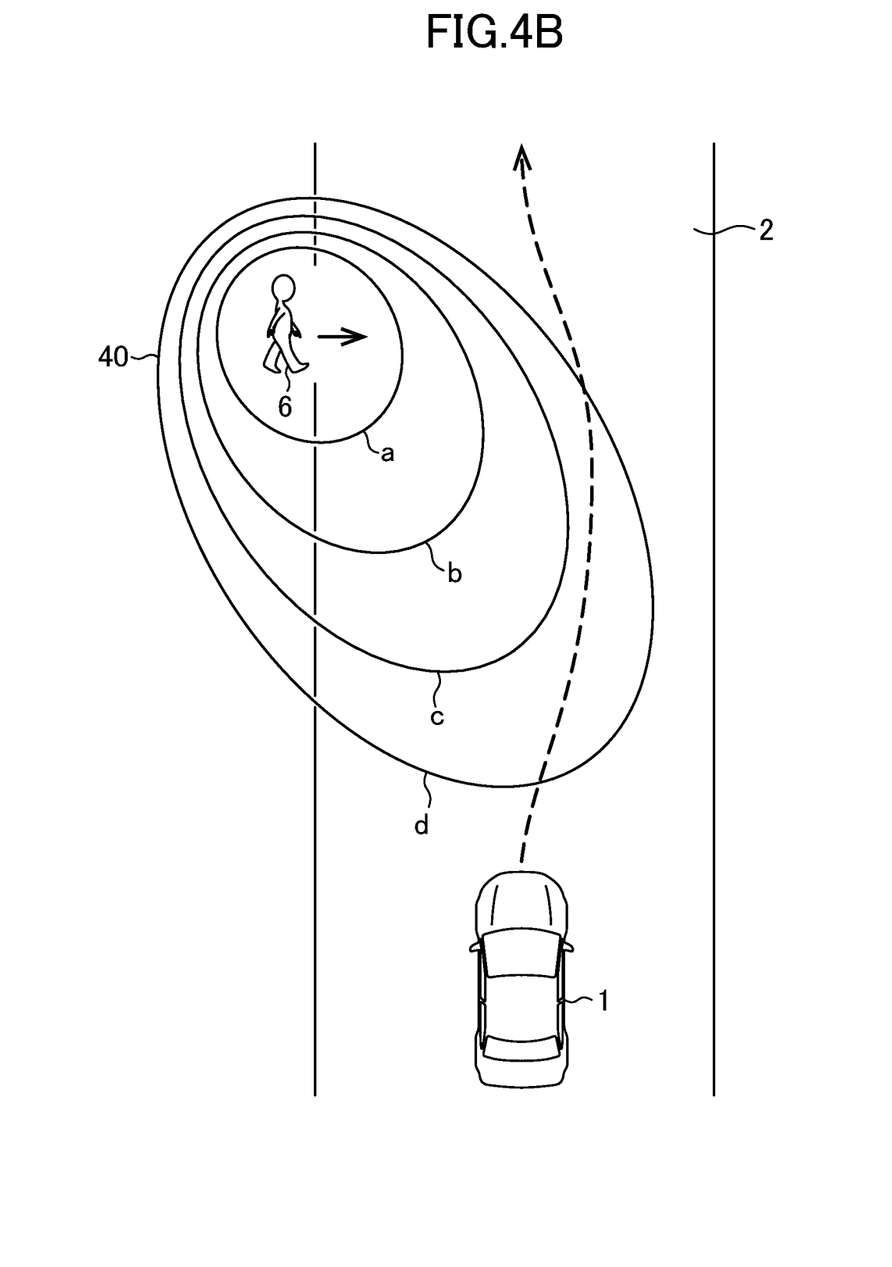
FIG. 4B is an explanatory diagram of a speed distribution area determined with respect to a pedestrian according to one embodiment of the present invention.
Figure 4C:
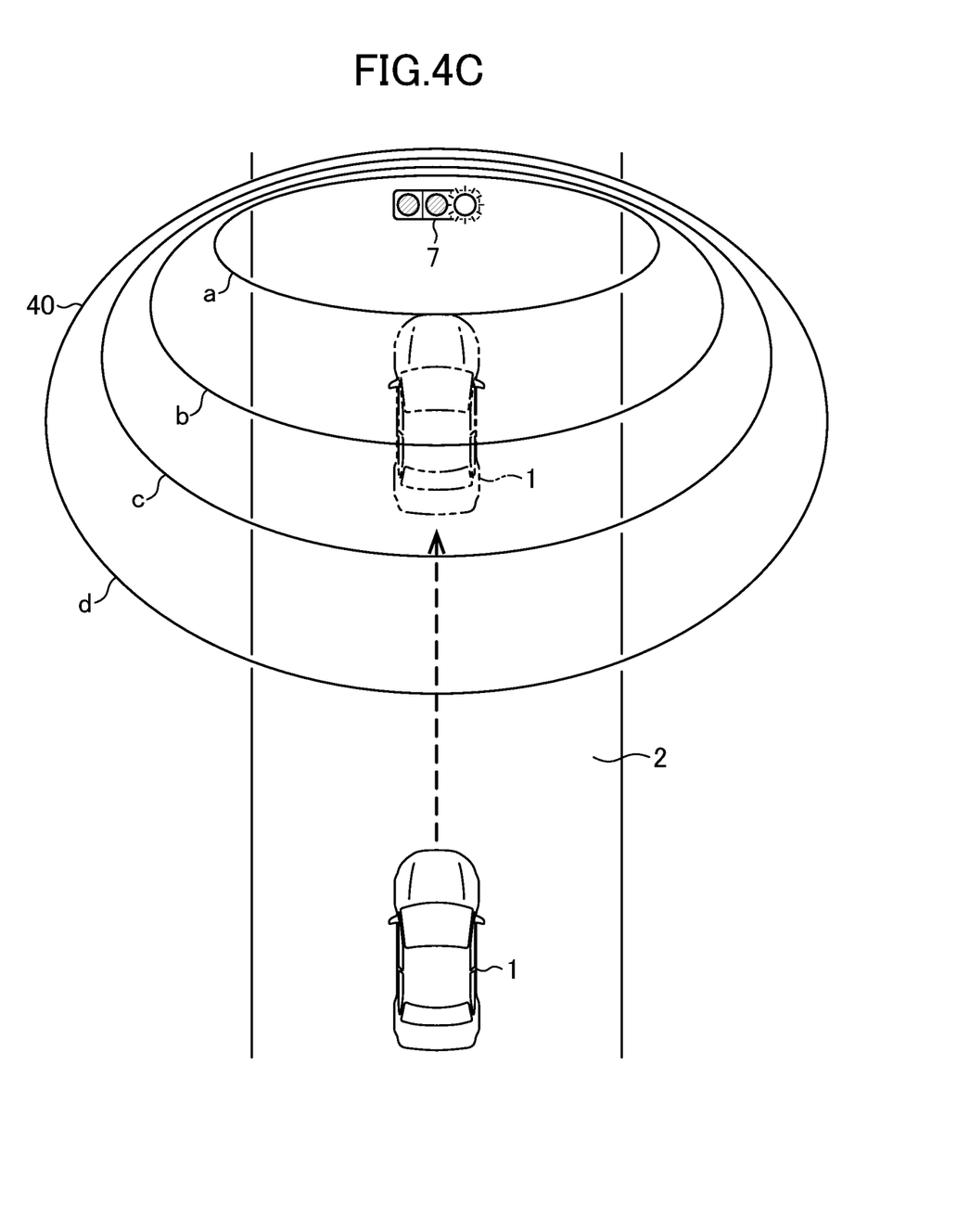
FIG. 4C is an explanatory diagram of a speed distribution area determined with respect to a traffic signal according to one embodiment of the present invention.

Further, FIG. 4B depicts a case where a pedestrian 6 on the travelling lane 2, or a pedestrian 6 on an external walking path near the travelling lane 2 is going to cross the travelling lane 2. It should be noted that in the case shown in FIG. 2, the object (the parked vehicle 3) does not have a velocity component perpendicular to the travelling direction of the vehicle 1. Thus, the speed distribution area 40 depicted in FIG. 2 is formed such that the iso-relative speed line of near elliptical shape extends toward the vehicle along the travelling direction of the vehicle 1.

However, as in FIG. 4B, when the object (pedestrian 6) has a velocity component in the lateral direction perpendicular to the travelling direction of the vehicle 1 or when it is predicted that the object will have a velocity component in the lateral direction, the speed distribution area 40 is defined to extend toward the vehicle 1 along the travelling direction of the vehicle 1 and to extend also in the lateral direction (rightward in FIG. 4B) along the travelling direction of the object. In FIG. 4B, it may be predicted from the image data by the car-mounted camera 21 that the pedestrian 6 is moving rightward, for example.

Still further, FIG. 4C depicts a case where a traffic signal 7 in front of the vehicle 1 on the travelling lane 2 is "red". In this case, the iso-relative speed lines a to d are defined in this order from the traffic signal 7 toward the vehicle 1. Thus, the vehicle 1 may gradually decelerate in the speed distribution area 40, and stop at the position of the iso-relative speed line a (0 km/h).

FIG. 5 is a graph similar to that shown in FIG. 3, but examples of the guardrail (line A2) and the pedestrian (line A3) are added in addition to the example of the vehicle (line A1). In the case of the guardrail (line A2), the degree of change in the allowable upper limit $V_{lim}$ with respect to the clearance X is set larger than that in the case of the vehicle (line A1). In the case of the guardrail, the danger is easier to be predicted than in the case of the vehicle, so that a larger degree of change (factor k) can be set.

In addition, in the case of the pedestrian (line A3), the degree of change (factor k) in the allowable upper limit $V_{lim}$ with respect to the clearance X is set smaller than that in the case of the vehicle (line A1). It is thereby possible to further improve safety for the pedestrian. In addition, different gains (factor k) may be set for respective ones of a case where the pedestrian is an adult, a case where the pedestrian is a child, and a case where there are a plurality of pedestrians.

It should further be noted that different values of the safe distance $D_0$ may be adopted for different types of the objects. For example, the safe distance may be determined such that it becomes smaller in the order of the pedestrian, the vehicle, the guardrail. Further, the safe distance may be larger for the child than that for the adult.

FIG. 6 depicts respective ones of relationships between a vehicle speed $V_{ABS}$ (absolute speed) and the safe distance $D_0$, in the case where the object is the vehicle (line B1), the case where the object is the guardrail (line 132), and the case where the object is the pedestrian (line B3). As depicted in FIG. 6, the safe distance $D_0$ is set larger as the absolute speed of the vehicle 1 gets larger. Therefore, the safe distance is set larger when the vehicle 1 overtakes the preceding vehicle at a high speed than when the vehicle overtakes the preceding vehicle at a low speed.

Thus, the speed distribution area may be determined based on various parameters. As the parameters, for example, the relative speed of the vehicle 1 and the object, the type of the object, the travelling direction of the vehicle 1, the travelling direction and the moving speed of the object, length of the object, the absolute speed of the vehicle 1 or the like may be considered. Specifically, the factor k and the safety distance $D_0$ may be selected based on these parameters.

It should further be noted that, in the present embodiment, the object can include a vehicle, a pedestrian, a bicycle, a travelling path partition, an obstacle, a traffic signal, a traffic sign or the like. Further, the vehicle may be differentiated by an automobile, a truck, and a motor bicycle. The pedestrian may be categorized to an adult, a child and a group. The travelling path partition may include a guiderail, a shoulder forming a step at a transverse end of the travelling path, a center median, and a lane border line. The obstacle may include a scarp, a trench, a hole and a fallen object. The traffic sign may include a halt line and a halt sign.

It should be noted that, in FIGS. 2 and 4, the speed distribution area is depicted independently for respective ones of the objects, but when a plurality of objects exist closely, a plurality of speed distribution areas may overlap with each other. Thus, in such an overlapping part, the iso-relative speed line may be determined by giving a priority to the line having a smaller allowable upper limit and excluding the others, or smoothly connecting the two near elliptical shapes, instead of the iso-relative speed line of the near elliptical shape as depicted in FIGS. 2 and 4.

Figure 7:
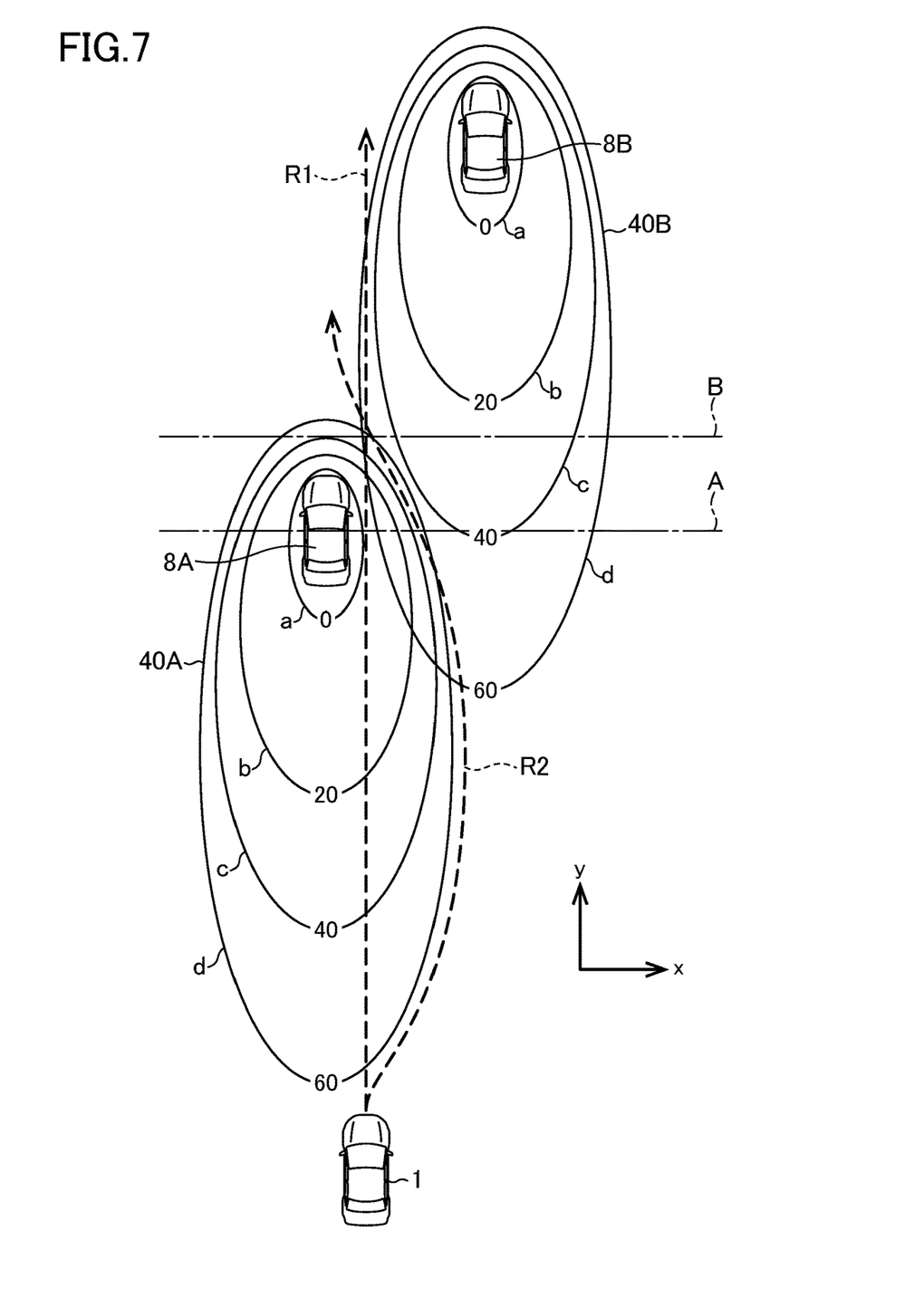
FIG. 7 is an explanatory diagram of an operation of a vehicle control system according to one embodiment of the present invention.
Figure 8:
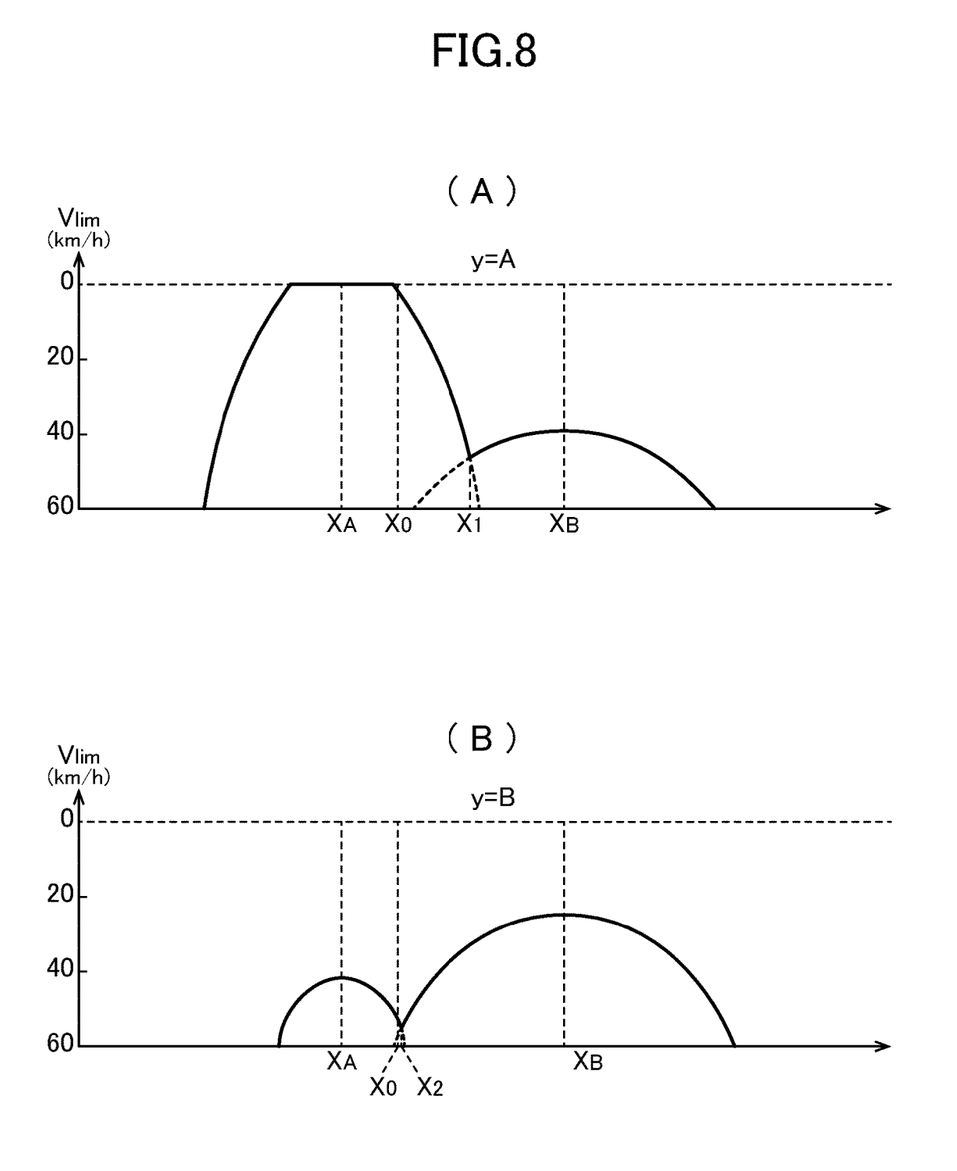
FIG. 8 is an explanatory diagram of an allowable upper limit of a relative speed in FIG. 7.
Figure 9:
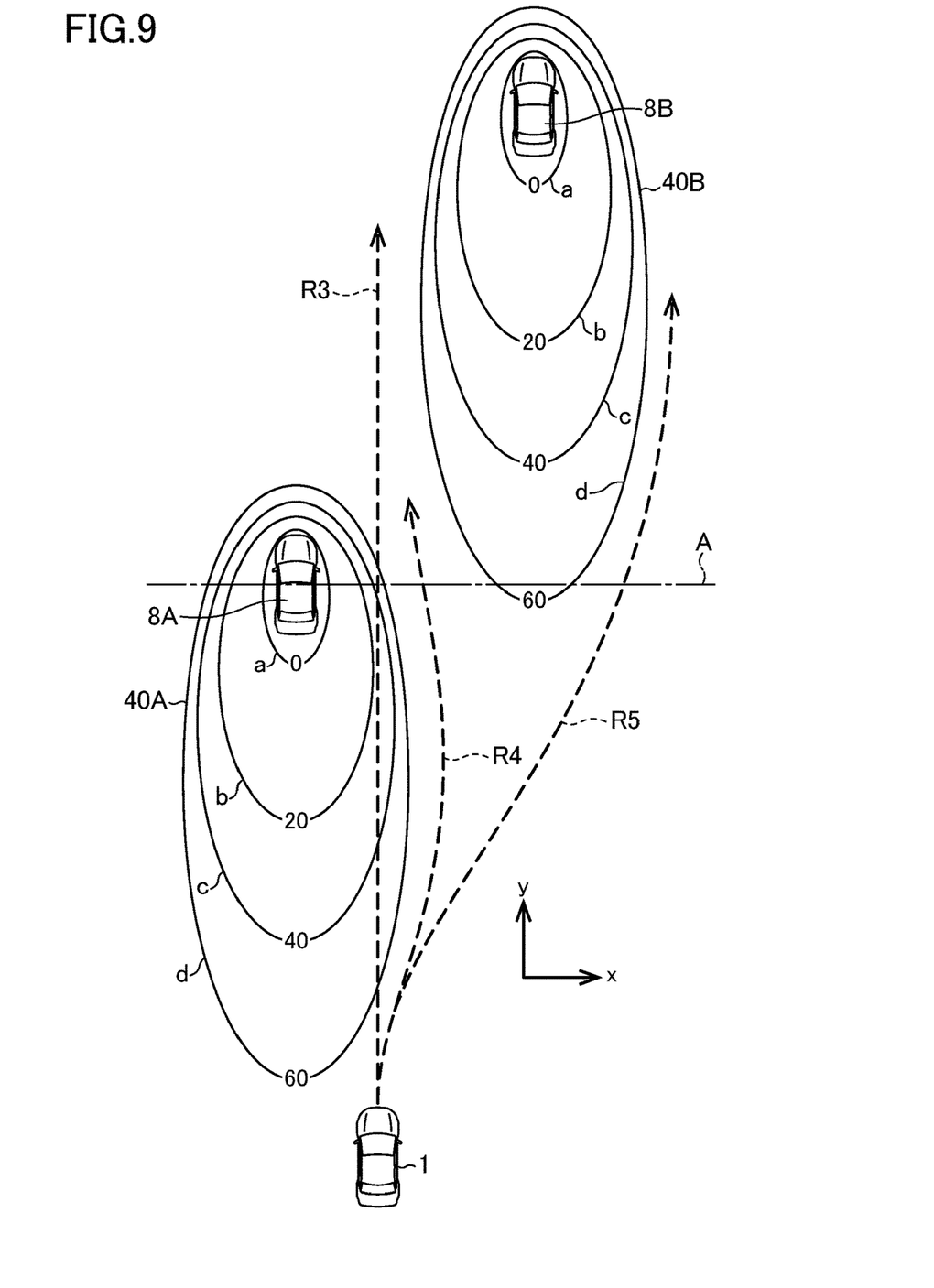
FIG. 9 is an explanatory diagram of an operation of a vehicle control system according to one embodiment of the present invention.
Figure 10:
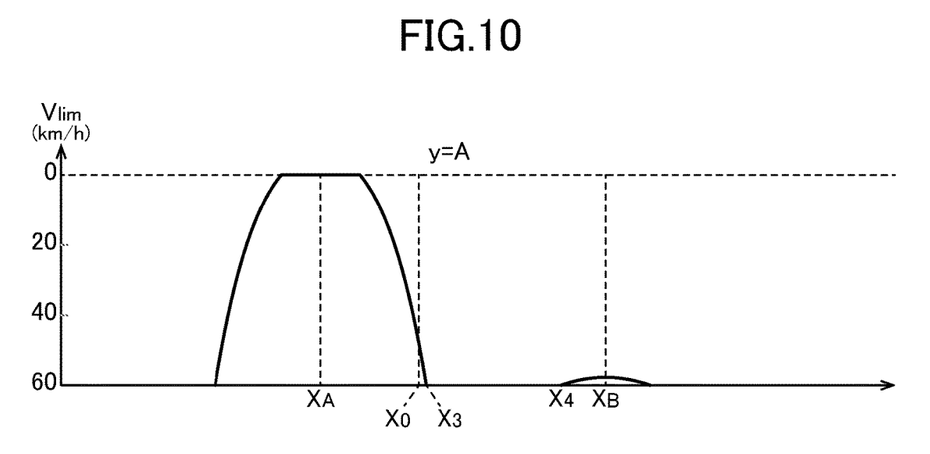
FIG. 10 is an explanatory diagram of an allowable upper limit of a relative speed in FIG. 7.
Figure 11:
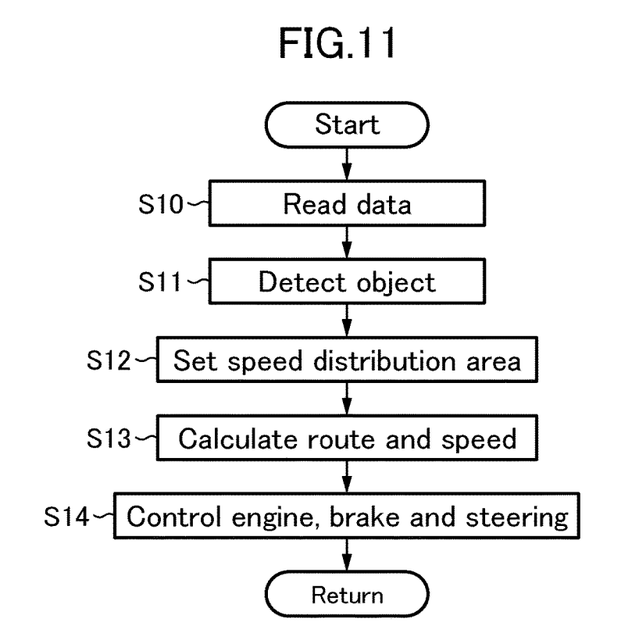
FIG. 11 is a process flow of a vehicle control system according to one embodiment of the present invention.

Subsequently, with reference to FIGS. 7 to 11, description will be made on a process flow of the vehicle control system according to the present embodiment. FIGS. 7 and 9 each shows an explanatory diagram of the operation of the vehicle control system, FIGS. 8 and 10 each shows an explanatory diagram of the allowable upper limit of the relative speed, and FIG. 11 is a process flow of the vehicle control system. Further, in FIGS. 7 and 9, for ease of comprehension, other objects such as the guardrail or the like are excluded.

As depicted in FIG. 7, when the vehicle 1 is travelling on the travelling lane, the ECU 10 (data acquisition part) of the vehicle 1 acquires various data from a plurality of sensors (S10). Specifically, the ECU 10 receives image data from the car-mounted camera 21, the image data representing an image of the front area of the vehicle 2 taken by the car-mounted camera 21, receives measurement data from the millimeter-wave radar 22, and receives vehicle speed data from the vehicle speed sensor 23.

The ECU 10 (object detection part) detects the object by processing the data acquired from exterior sensors including at least the car-mounted camera 21 (S11). Specifically, the ECU 10 detects the vehicles 8A and 8B as the objects by executing an image processing of the image data. At this time, the type of the objects (in this case, a vehicle) is specified. In addition, the ECU 10 can detect the presence of a specific obstacle from the map information.

In addition, the ECU 10 (position and relative speed calculation part) acquires the position and the relative speed of the detected objects (vehicles 8A and 8B) with respect to the vehicle 1 based on the measurement data. Further, the position of the object includes a y direction position (longitudinal distance) along the travelling direction of the vehicle 1, and an x direction position (lateral distance) along the lateral direction orthogonal to the travelling direction. For the relative speed, the relative speed included in the measurement data may be used directly, or a velocity component along the travelling direction may be calculated from the measurement data. In addition, the velocity component perpendicular to the travelling direction may not necessarily be calculated, but may be estimated from the plurality of measurement data and/or the plurality of image data, if necessary. Further, the vehicles 8A and 8B are travelling in the same direction as the vehicle 1.

The ECU 10 (speed distribution area determining part) further functions to set speed distribution areas 40A and 40B for all of the detected objects (specifically, the vehicles 8A and 8B), respectively (S12). In addition, the ECU 10 (route calculation part) calculates the route where the vehicle 1 may travel, and a set vehicle speed or an object speed at each of the positions on the route, according to a predetermined mode, based on all of the set speed distribution areas 40A, 40B (S13).

Further, the vehicle speed is determined at a value limited by the allowable upper limits of the plurality of speed distribution areas at respective points on the route. Specifically, the relative speed with respect to the object corresponding to the determined speed is determined such that the relative speed has a value of the allowable upper limit $V_{lim}$ which is smaller among the allowable upper limits of the plurality of the speed distribution areas. In addition, the set speed is adjusted such that a change in speed along the route may become smooth. Then, in order for the vehicle 1 to travel on the calculated route, the ECU 10 (avoidance control executing part) executes an avoidance control as in the followings according to the predetermined mode (S14).

Further, the vehicle 1 is configured such that the driver can select a desired drive assist mode using an input device not shown. Further, a predetermined mode may be set in the ECU 10 in advance. In addition, the process flow of FIG. 11 is repeatedly executed at every predetermined time (for example, 0.1 second), so that the calculated route and the set speed on the route changes with time.

In the situation shown in FIG. 7, the inter-vehicle distance between the vehicle 8A and the vehicle 8B is short, so that the iso-relative speed line d of the speed distribution area 40A and the iso-relative speed line d of the speed distribution area 40B are overlapped. FIG. 8(A) depicts a change in the allowable upper limit $V_{lim}$ in the lateral direction (x direction) at a longitudinal position A (refer to FIG. 7) where the vehicle 8A is positioned. In addition, FIG. 8(B) depicts a change in the allowable upper limit $V_{lim}$ at a longitudinal position B between the vehicle 8A and the vehicle 8B (refer to FIG. 7). In the figures, respective ones of $x_0$, $x_A$ and $x_B$ show widthwise center positions for respective ones of the vehicle 1, vehicle 8A and vehicle 8B in the x direction.

Therefore, when the vehicle 1 follows a route which passes between the vehicle 8A and the vehicle 8B (for example, the route R1, R2 or the like), the relative speed of the vehicle 1 is limited by the two speed distribution areas 40A and 40B. Specifically, the relative speed of the vehicle 1 is limited by the smaller one among the allowable upper limits defined in the two speed distribution areas 40A and 40B as depicted in FIGS. 8(A) and 8(B) (refer to solid lines in the figures).

Between the vehicle 8A and the vehicle 8B, at the position A in the longitudinal direction (y direction), the allowable upper limit $V_{lim}$ becomes largest at the position $x_1$ in the lateral direction, and at the position B, the allowable upper limit $V_{lim}$ becomes largest at the position $x_2$. Thus, the largest value of the allowable upper limit $V_{lim}$ (and the lateral position x) changes depending on the longitudinal position y.

The route R1 is a straight travelling route. The route R1 is calculated when a straight traveling prioritized mode (or a shortest distance prioritized mode) is selected. When the vehicle 1 travels straight on the current travelling route (specifically, travels on the route R1) and overtakes the vehicles 8A and 8B, at the longitudinal position A, the relative speed for the vehicle 8A may be limited by the allowable upper limit of about 0 km/h, and the relative speed for the vehicle 8A may be limited by the allowable upper limit of about 60 km/h. In addition, at the longitudinal position B, the relative speed for the vehicles 8A and 8B may be limited by the allowable upper limit of about 50 km/h. Therefore, on the route R1, the vehicle 1 can overtake the other vehicles by performing deceleration and acceleration.

In addition to the straight traveling prioritized mode, when an automatic speed following mode for automatically following the selected speed is selected, while travelling on the route R1, the vehicle 1 may be automatically decelerated to follow respective ones of the allowable upper limits at respective ones of the y direction positions until the vehicle 1 overtakes the vehicles 8A and 8B, and after passing the vehicle 8B, accelerated up to the selected speed. In order to execute such avoidance control, the ECU 10 outputs respective ones of the engine output change request signal and the brake request signal to respective ones of the engine control system 31 and the brake control system 32 so that it is restricted not to exceed the allowable upper limit by following the relative speed of the allowable upper limit at or lower than the set or determined vehicle speed on the route R1.

Further, when the automatic speed following mode is not additionally selected, if the vehicle 1 enters the route R1 at a relative speed at or more than 60 km/h, even if the driver maintains the same depressed or actuated position of the accelerator, the speed of the vehicle 1 is automatically controlled under the action of the avoidance control. Specifically, unless the driver decreases the depressed or actuated amount of the accelerator to decelerate the vehicle to the relative speed which is of a value at or less than the allowable upper limit, the relative speed of the vehicle 1 is maintained at the allowable upper limit at each of the points. In this condition, when the vehicle 1 enters the route R1 for example at the relative speed of 40 km/h, the relative speed is maintained at 40 km/h (not accelerated or decelerated) until the vehicle enters the iso-relative speed line c (corresponding to 40 km/h) if the accelerator depressed or actuated amount is not decreased.

It should be further noted that the route R2 is calculated when a speed prioritized mode which is a mode suppressing a traveling speed reduction is selected. The route R2 is a route which allows the vehicle 1, travelling at the relative speed of 60 km/h, to continuously pass points where the allowable upper limit $V_{lim}$ is largest, with the vehicle speed at that time being adopted as the upper limit. Specifically, the route R2 is formed as extending in the travelling direction of the vehicle 1 by connecting points where two allowable upper limits $V_{lim}$ of the two speed distribution areas 40A and 40B are equal, in a region passing between the vehicle 8A and the vehicle 8B.

Therefore, when the vehicle 1 travels on the route R2, the route R2 is along the iso-relative speed line d of the vehicle 8A, so that the allowable upper limit $V_{lim}$ is maintained at 60 km/h until it reaches the iso-relative speed line d of the vehicle 8B. Then, within the iso-relative speed line d of the vehicle 8B, the route R2 continuously passes positions which are apart each other in x direction and where the allowable upper limit $V_{lim}$ of the two speed distribution areas 40A and 40B are largest. Further, it should be noted that, in FIG. 7, the right side of the vehicle 8B is determined as being prohibited to pass.

In addition to the speed prioritized mode, if an automatic steering mode for automatically controlling a steering direction of the vehicle 1 is selected, the vehicle 1 travels on the route R2 with automatic steering function, and the relative speed is maintained at the allowable upper limits $V_{lim}$ at each of the points on the route R2. In order to execute such avoidance control, the ECU 10 outputs the steering direction change request signal to the steering control system 33 so that the vehicle 1 travels on the route R2, In addition, similar to the above, the ECU 10 outputs respective ones of the engine output change request signal and the brake request signal to respective ones of the engine control system 31 and the brake control system 32 so that it is prevented from exceeding the allowable upper limit with the relative speed following the allowable upper limit at or lower than a vehicle speed according to the depressed or actuated amount of the accelerator on the route R2.

Further, when the automatic steering mode is not additionally selected, under a situation where the vehicle 1 is travelling at the relative speed of 60 km/h, if the path of the vehicle 1 is changed by a driver's actuation of the steering wheel to enter the route R2, the ECU 10 outputs the engine output request signal and the brake request signal so that the vehicle 1 may travel on the route R2 at the selected speed which follows the allowable upper limit.

Further, other than the aforementioned straight traveling prioritized mode and/or the speed prioritized mode, it is possible to configure that the route may be calculated to obtain a route other than the routes R1 and R2 depending on preference of the driver. For example, it is possible to calculate a route taking into account an amount of change in a longitudinal acceleration (longitudinal G) and an amount of change in a lateral acceleration (lateral G), on the route as parameters.

On the other hand, in the situation shown in FIG. 9, the inter-vehicle distance between the vehicle 8A and the vehicle 8B is large, so that the iso-relative speed line d of the speed distribution area 40A and the iso-relative speed line d of the speed distribution area 40B are not overlapped. FIG. 10 depicts the allowable upper limit $V_{lim}$ when the vehicle 8A is in the longitudinal position A.

A route R3 is a straight travelling route which is calculated when the straight traveling prioritized mode is selected. The route R3 is the straight travelling route similar to the route R1 in FIG. 7 so that description will be omitted.

Further, routes R4 and R5 are calculated when the speed prioritized mode is selected. Under a situation shown in FIG. 9, it is possible to produce a route which passes outside the two iso-relative speed lines d (for example, the routes R4 and R5 or the like), and in such route, the allowable upper limit $V_{lim}$ becomes a value at or higher than 60 km/h. Thus, the vehicle 1 travelling at the relative speed of 60 km/h may travel the routes R4 and R5 (recommended travelling route) without reducing the relative speed. Further, under the situation shown in FIG. 9, the vehicle 1 is allowed to pass the right side of the vehicle 8B.

In the route R4, as depicted in FIG. 10, when the vehicle 8A is in the longitudinal position A, the allowable upper limit $V_{lim}$ becomes a value at or higher than 60 km/h between a position $x_3$ and a position $x_4$. Therefore, for example, it is possible to set the route R4 such that the vehicle 1, travelling at the relative speed of 60 km/h, passes an arbitrary position between the position $x_3$ and the position $x_4$, but it may be possible to calculate a sole route R4 since there may possibly be various limitations or restrictions. Such limitations may, for example, be a limitation that the vehicle should pass a lateral position x close to a center of the travelling lane, a limitation that the vehicle should pass a center between the position $x_3$ and the position $x_4$ where the allowable upper limit is the current relative speed, a limitation that the vehicle should pass a lateral position x having the largest allowable upper limit $V_{lim}$ between the position $x_3$ and the position $x_4$, a requirement for making a distance of the route R4 the shortest, or the like.

It should be noted that, on the route R5, the vehicle 1 travels the left side of the two speed distribution areas 40A and 40B so as to avoid these areas. Therefore, the route R5 has a distance longer than the route 4 for the vehicle 1 in avoiding the speed distribution area 40A in the lateral direction.

Further, which of the calculated routes R4 and R5 is to be selected may be set in the ECU 10 in advance at the time of manufacture, or the driver may manually set on the ECU 10 by an input device (not shown). For example, it is possible to set such that the route which has the smaller distance for avoiding the speed distribution area 40A in the lateral direction may be selected (the route R4 in the case of FIG. 9) from the routes R4 and R5. In addition, when travelling on the route R4, if another vehicle is located as an obstacle after overtaking the vehicle 8, (for example, when the inter-vehicle distance between the vehicle 1 and another vehicle is at or less than the predetermined distance after overtaking the vehicle 8A), it is possible to set such that the route R5 is selected. In addition, it may be set to prioritize the route R5 which passes outside the two objects rather than the route R4 which passes between the two objects, or vice versa.

In addition to the speed prioritized mode, when the automatic steering mode for automatically controlling the steering direction of the vehicle 1 is selected, since the allowable upper limit on the routes R4 and R5 is at least larger than the relative speed of 60 km/h, if the vehicle 1 enters the routes R4 or R5 under the relative speed of 60 km/h, the vehicle travels on the routes R4 or R5 under the automatic steering control with the same vehicle speed being maintained. In order to execute such avoidance control, the ECU 10 outputs the steering direction change request signal to the steering control system 33 so that the vehicle travels on the route R4 or R5. However, at this time, if there is no change in speed of the vehicles 8A and 8B, the vehicle speed according to the depressed or actuated amount of the accelerator is maintained so that no engine output change request signal and/or brake request signal are produced.

Further, when the automatic steering mode is not additionally selected, if the vehicle 1 travelling at the relative speed of 60 km/h has its path changed by the driver's operation of the steering wheel to enter the route R4 or R5, the vehicle 1 is not subjected to the limitation of the relative speed by the speed distribution areas 40A and 40B. Therefore, during travelling on the route R4 or R5, the ECU 10 does not output the engine output change request signal and/or the brake request signal, so that the vehicle speed according to the depressed or actuated position of the accelerator is maintained.

Subsequently, the operation of the vehicle control system (ECU) 10 in accordance with the present embodiment will be described.

In the present embodiment, the speed distribution area 40 is determined over a range from the lateral area to the rearward and from the lateral area to the forward areas of the detected objects (the parked vehicle 3, the pedestrian 6 or the like). In this speed distribution area, the allowable upper limit of the relative speed of the vehicle with respect to the object is determined. In addition, in the present embodiment, when a plurality of objects (vehicles 8A, 8B or the like) are detected, respective ones of the speed distribution areas 40A and 40B are determined with respect to respective ones of the objects, and the relative speed of the vehicle 1 is controlled to restrict it from exceeding the allowable upper limits which are set for the plurality of speed distribution areas 40A and 40B. Therefore, when the vehicle travels near the plurality of objects (vehicles 8A, 8B or the like), the relative speed is limited for all of the objects around the vehicle 1. As such, since the present embodiment is configured to limit the allowable upper limit for the relative speed between the object and the vehicle, and allows for integrally controlling the safe driving assist system such as the automatic brake control and the steering assist control, it is possible to provide the safe driving assistance with a simple and efficient speed control.

In the present embodiment, the speed distribution area is set or determined such that the allowable upper limit is made lower as the lateral distance and the longitudinal distance from the object become smaller. Thus, according to the present embodiment, the control is such that the allowable upper limit for the relative speed of the vehicle 1 is limited according to the distance from the object, and when the vehicle 1 is far from the object, a large relative speed is allowed, but when the vehicle 1 approaches close to the object, the vehicle speed is limited to make the relative speed lower.

According to the present embodiment, in the avoidance control (S14), the speed and/or the steering direction of the vehicle 1 is changed to restrict the relative speed of the vehicle 1 in the plurality of speed distribution areas 40A, 40B from exceeding the allowable upper limits. For this avoidance control, it is possible to change (decelerate) the speed itself of the vehicle 1 as described in connection with the route R1 in FIG. 7, or to change the travelling path of the vehicle by changing the steering direction so that the vehicle is passed an area with a larger allowable upper limit as described in connection with the route R4, R5 of FIG. 9, or to change both of the speed and the steering direction as described in connection with the route R2.

According to the present embodiment, in the avoidance control, the route of the vehicle 1 is calculated based on the plurality of speed distribution areas 40A and 40B, so that it is possible for the vehicle to travel on a safe route with respect to the object.

In the present embodiment, the route R2 is formed as extending in the travelling direction of the vehicle 1 by connecting the points where two allowable upper limits defined for the two vehicles 8A and 8B are equal, at the region where the vehicle 1 passes between the two vehicles 8A and 8B. Thus, in the present embodiment, when the vehicle 1 passes between the two vehicles 8A and 8B, it may travel along the route where the allowable upper limit of the relative speed is largest.

In the present embodiment, in the avoidance control, calculation is made to obtain one or more recommended travelling route/routes R4, R5, so that the vehicle 1 may be able to travel at the current relative speed, so that it is possible for the vehicle to travel without changing speed by travelling on the recommended travelling route,

LIST OF REFERENCE SIGNS 1, 3, 8A, 8B: vehicle
2: travelling lane
4: guardrail
5: lane border line
6: pedestrian
7: traffic signal
21: car-mounted camera
22: millimeter-wave radar
23: vehicle speed sensor
24: positioning system
25: navigation system
31: engine control system
32: brake control system
33: steering control system
40, 40A, 40B: speed distribution area
100: vehicle control system
a, b, c, d: iso-relative speed line
R1, R2, R3, R4, R5: route

The invention claimed is:

1. A vehicle control system mounted on a vehicle; the system being configured to:
    detect an object external to the vehicle,
    determine a speed distribution area which defines a distribution of an allowable upper limit of a relative speed of the vehicle with respect to the object in a travelling direction of the vehicle, in a range from a lateral area to a rearward area and from the lateral area to a forward area of the object in the travelling direction of the vehicle,
    determine respective speed distribution area for respective objects when a plurality of objects are detected, and
    execute an avoidance control for restricting the relative speed of the vehicle for respective objects from exceeding the allowable upper limits defined by the plurality of speed distribution areas for the plurality of objects.

2. The vehicle control system as recited in claim 1, wherein the speed distribution area is set such that the allowable upper limit is made lower as a lateral distance and a longitudinal distance from the object become smaller.

3. The vehicle control system as recited in claim 1, wherein, in the avoidance control, the speed and/or the steering direction of the vehicle is changed to restrict the relative speed of the vehicle in the plurality of speed distribution areas from exceeding the allowable upper limits.

4. The vehicle control system as recited in claim 1, wherein, in the avoidance control, a route of the vehicle is calculated based on the plurality of speed distribution areas.

5. The vehicle control system as recited in claim 4, wherein the route is formed as extending in a travelling direction of the vehicle by connecting points where two allowable upper limits defined for the two objects are equal, under a situation where the vehicle passes between two objects among the plurality of objects.

6. The vehicle control system as recited in claim 4, wherein, in the avoidance control, calculation of route is made to obtain one or more recommended travelling route/routes on which the vehicle may travel at a current relative speed.

\* \* \* \* \*